(12) United States Patent
Ishikawa

(10) Patent No.: US 7,965,417 B2
(45) Date of Patent: Jun. 21, 2011

(54) TONE CORRECTION TABLE GENERATION METHOD AND APPARATUS

(75) Inventor: Tomokazu Ishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 11/956,508

(22) Filed: Dec. 14, 2007

(65) Prior Publication Data

US 2008/0144060 A1    Jun. 19, 2008

(30) Foreign Application Priority Data

Dec. 18, 2006    (JP) .................................. 2006-340574

(51) Int. Cl.
*G06F 15/00* (2006.01)

(52) U.S. Cl. ....... 358/3.01; 358/1.9; 358/3.23; 358/504; 358/518; 358/524

(58) Field of Classification Search ................... 358/1.9, 358/3.01, 3.23, 504, 518, 520, 523, 524; 382/162, 167, 274

See application file for complete search history.

(56) References Cited

U.S. PATENT DOCUMENTS

| | | | | |
|---|---|---|---|---|
| 7,130,076 B2 * | 10/2006 | Shibuya et al. | ............... | 358/1.9 |
| 7,385,726 B2 * | 6/2008 | Kuno et al. | ................ | 358/1.9 |
| 2002/0030832 A1 * | 3/2002 | Shibuya et al. | ............... | 358/1.9 |
| 2002/0159083 A1 * | 10/2002 | Arai et al. | .................... | 358/1.9 |
| 2003/0002096 A1 * | 1/2003 | Sugiyama | .................. | 358/518 |
| 2003/0002736 A1 * | 1/2003 | Maruoka et al. | ............. | 382/168 |
| 2004/0131371 A1 | 7/2004 | Itagaki et al. | ................ | 399/49 |
| 2005/0237551 A1 * | 10/2005 | Kuno et al. | .................... | 358/1.9 |
| 2010/0079816 A1 * | 4/2010 | Inoue | .......................... | 358/3.23 |
| 2010/0118347 A1 * | 5/2010 | Ishii | ........................... | 358/2.1 |

FOREIGN PATENT DOCUMENTS

| | | |
|---|---|---|
| JP | 2002-292936 | 10/2002 |
| JP | 2003-107835 | 4/2003 |
| JP | 2003-324619 | 11/2003 |
| JP | 2004-205701 | 7/2004 |
| JP | 2006-93807 | 4/2006 |

OTHER PUBLICATIONS

Office Action Dated Feb. 14, 2011 in JP 2006-340574.

* cited by examiner

*Primary Examiner* — Kimberly A Williams
(74) *Attorney, Agent, or Firm* — Fitzpatrick, Cella, Harper & Scinto

(57) ABSTRACT

There is provided a method of generating a tone correction table used to correct tone characteristics of image data of each component color in a color image forming apparatus, comprising the steps of outputting color patch images of each component color for respective tone levels corresponding to a plurality of different image data values, acquiring colorimetric values including brightness values, chromatic values, and reflection spectra of respective patches by measuring colors of the output color patch images, analyzing characteristics of the calorimetric values for respective tone levels based on the calorimetric values of the color patch images, selecting a tone correction table generation method according to the characteristics obtained in the analysis step, and generating a tone correction table to have tone characteristics as target characteristics according to the selected tone correction table generation method.

11 Claims, 16 Drawing Sheets

TONE CORRECTION TABLE GENERATION METHOD AND APPARATUS

BACKGROUND OF THE INVENTION

1. Field of the Invention

The present invention relates to a color image forming apparatus such as a color printer, color copying machine, or the like and, more particularly, to a tone correction table generation method and apparatus, which control the tone characteristics that influence the color reproducibility of an image, and an image forming method and apparatus using a tone correction table.

2. Description of the Related Art

In recent years, color image forming apparatuses such as color printers, color copying machines, and the like, which adopt an electrophotography system, ink-jet system, and the like, are required to enhance the image quality of output images. Especially, tonality and its stability impose a large influence on human decision about a good or bad image. Furthermore, upon enhancement of image quality, image quality enhancement in terms of colors such as improvement of the color reproducibility, color matching between images to be printed by different apparatuses, that between an image to be displayed on a display such as an LCD or the like and that to be printed, and so forth is required. To meet such requirements, for the purpose of improving the tonality and its stability, various tone correction table generation methods and calibration methods for obtaining desired tone characteristics by changing the contents of such tone correction tables have been proposed.

For example, Patent reference 1 discloses a method of generating a tone correction table to have tone characteristics in which the brightness level changes linearly. Patent reference 2 discloses a method of generating a tone correction table to have tone characteristics in which an accumulated color difference changes linearly. Patent reference 3 discloses a method of controlling density and tone characteristics by correcting a calibration table in consideration of ternary colors by combining cyan (C), magenta (M), and yellow (Y). Patent reference 4 discloses a method of generating a tone correction table so that an image after correction has tone characteristics in which the brightness level of black (Bk) changes linearly and the chroma or chromatic levels of secondary colors of CMY change linearly.

[Patent reference 1] Japanese Patent Laid-Open No. 2002-292936

[Patent reference 2] Japanese Patent Laid-Open No. 2003-324619

[Patent reference 3] Japanese Patent Laid-Open No. 2003-107835

[Patent reference 4] Japanese Patent Laid-Open No. 2004-205701

However, upon execution of tone control based on a brightness value by the aforementioned conventional tone correction table generation method, a brightness change amount becomes small since the difference between the brightness values of a lightest portion (white portion) and a darkest portion (solid color portion of yellow) is small in, for example, Y (yellow). In such a case, precise tone characteristics cannot often be realized due to the influence of calorimetric errors and inability to perform fine tone separation due to the small brightness difference. On the other hand, upon execution of tone control based on a chromatic value by the conventional tone correction table generation method, an image signal value increases but the chromatic value does not always increase in terms of a chroma change in continuous tone reproduction from a lightest portion (white portion) to a darkest portion (solid color portion) in, for example, C (cyan) and M (magenta). Conversely, even when the image signal value increases, a chromatic value which must increase as the tone level is getting closer to the solid color portion often decreases. Hence, tone control based only on the chromatic value is often disabled depending on the characteristics of color materials. When executing tone control based on a color difference value as the conventional tone correction table generation method, when a tone correction table has characteristics in which the chromatic value decreases as the image signal value increases, the color difference value undesirably decreases at a tone level where the color difference value must increase with increasing image signal. For this reason, the tone control based on the color difference value is often disabled.

SUMMARY OF THE INVENTION

The present invention has been made to solve the aforementioned problems, and has as its object to provide a tone correction table generation method which can realize satisfactory color reproducibility and a method which can improve calibration precision.

In order to achieve this object, the present invention has the following arrangement.

That is, there is provided a method of generating a tone correction table used to correct tone characteristics of image data of each component color in a color image forming apparatus, the method comprises:

an output step of outputting color patch images of each component color for respective tone levels corresponding to a plurality of different image data values;

a colorimetry step of acquiring calorimetric values including brightness values, chromatic values, and reflection spectra of respective patches by measuring colors of the output color patch images;

an analysis step of analyzing characteristics of the calorimetric values for respective tone levels based on the colorimetric values of the color patch images;

a selection step of selecting a tone correction table generation method according to the characteristics obtained in the analysis step; and a generation step of generating a tone correction table to have tone characteristics as target characteristics according to the selected tone correction table generation method.

According to the present invention, the color reproducibility and, especially, the tone characteristics of an image can be improved.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

<Apparatus Arrangement>

Figure 1:
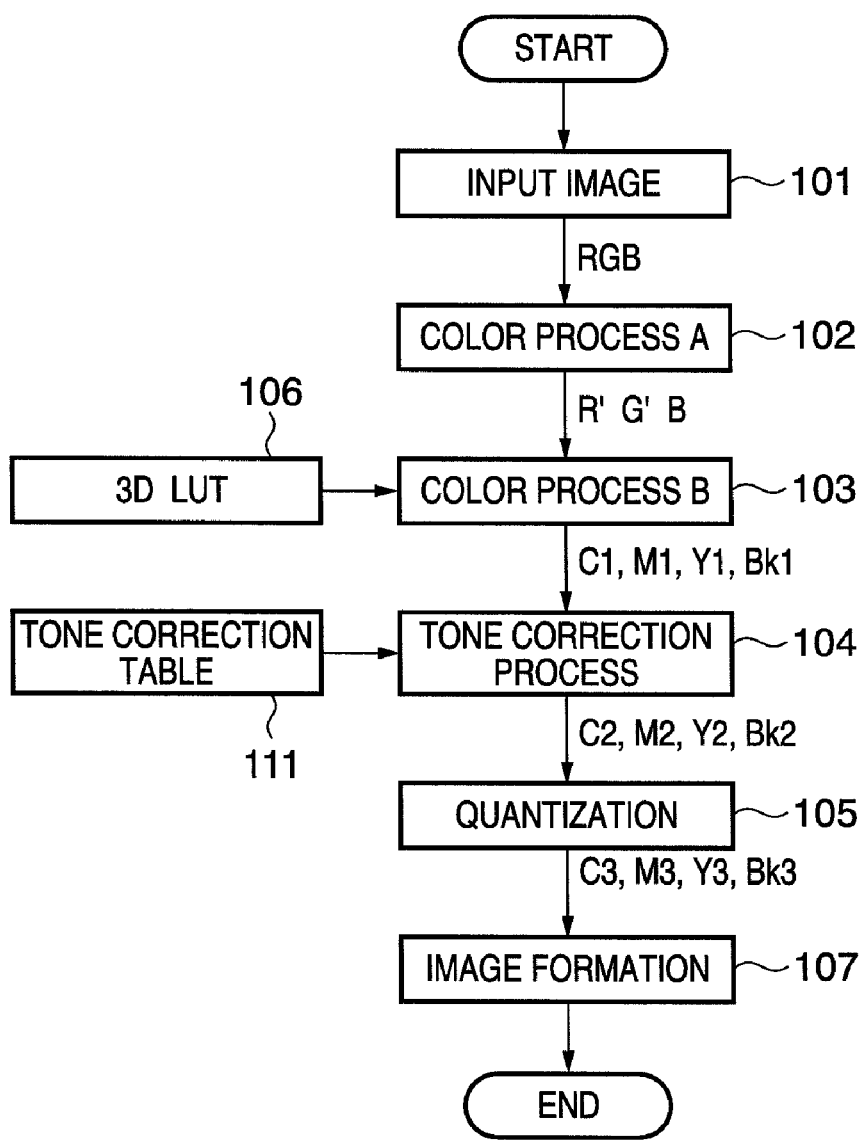
FIG. 1 is a flowchart showing image signal processing (color processing) for printing.

FIG. 1 is a flowchart showing an example of the processing of an ink-jet printer as an image forming apparatus which is applicable to the present invention. In an image input step 101, R, G, and B original image signals are input from an image input device such as a digital camera, scanner, or the like, or a computer. In a color process A step 102, the input R, G, and B original image signals into R', G', and B' signals. The R', G', and B' signals are R, G, and B data which have undergone conversions for color cast, contrast, and chroma corrections. Or the R', G', and B' signals are R, G, and B data which are converted into an RGB space depending on each device. In a color process B step 103, the R', G', and B' signals are converted into signal values corresponding to respective color inks. The printer of this embodiment forms an image using inks of four component colors Y, M, C, and Bk. Therefore, the converted signals are image signals C1, M1, Y1, and Bk1 corresponding to ink colors C (cyan), M (magenta), Y (yellow), and Bk (black). Note that the practical color process B 103 is a color conversion using a three-dimensional lookup table (3DLUT) 106 which stores the relationship between input values R, G, and B, and output values C, M, Y, and Bk. Input values which do not match the table grid point values of the 3DLUT 106 are converted into output values by interpolation based on the output values of the table grid points around the input values.

In a tone correction process step 104, the image signals C1, M1, Y1, and Bk1 undergo tone corrections using a tone correction table 111 according to the present invention to obtain image signals C2, M2, Y2, and Bk2 after the tone corrections. Note that tone corrections using color attributes such as chromatic values, color difference values, and the like are applied so that these attributes have predetermined characteristics (target characteristics; e.g., linear characteristics) with respect to image signals.

In a quantization step 105, the image signals C2, M2, Y2, and Bk2 after the tone corrections are quantized to be input to an engine of the printer to obtain image signals C3, M3, Y3, and Bk3. Note that the quantization processing is done using a conventionally known quantization method such as error diffusion, dithering, or the like. The quantization processing is typically digitization. However, when the engine supports multi-value printing, the quantization processing according to the specification of the engine is executed. In an image forming step 107, an image is formed on a print medium according to the quantized image data. In this embodiment, an image is formed according to image data of respective component colors using C, M, Y, and Bk color inks.

Note that the respective steps in FIG. 1 also correspond to functional blocks of the ink-jet printer. That is, in the ink-jet printer, the functional blocks corresponding to the respective steps are connected sequentially, as shown in FIG. 1, and process and print input image signals. The same arrangement as that of FIG. 1 applies to the second to fourth embodiments to be described later.

<Hardware Arrangement>

Figure 14:
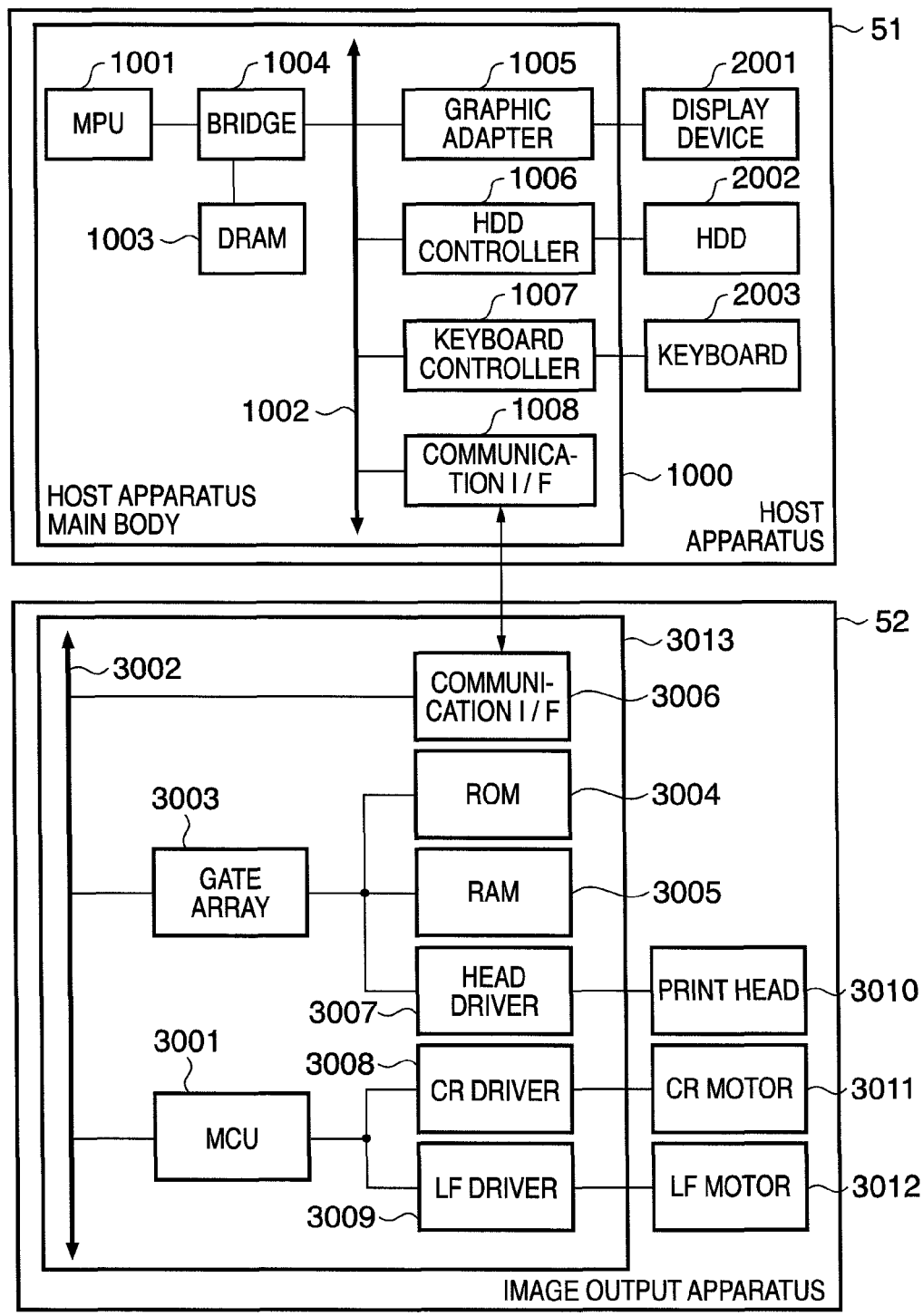
FIG. 14 is a hardware block diagram of a printing system.

The hardware arrangement of a host apparatus 51 and the ink-jet printer, that is, an image output apparatus 52, will be described below with reference to FIG. 14. FIG. 14 is a schematic block diagram showing the hardware arrangement of the host apparatus 51 and image output apparatus 52 which configure an information processing system.

As shown in FIG. 14, the entire host apparatus 51 is configured by a processor 1000 and its peripheral devices. The image output apparatus 52 is configured by drive units such as a print head 3010, a carrier (CR) motor 3011 for driving a carrier which conveys the print head 3010, a feed motor 3012 for feeding paper sheets, and the like, and a control circuit unit 3013 as a gate array.

The processor 1000 of the host apparatus 51 includes an MPU 1001 which controls the overall host apparatus according to control programs, a bus 1002 which interconnects system components, and a DRAM 1003 which temporarily stores programs to be executed by the MPU 1001, data, and the like. Also, the processor 1000 includes a bridge 1004 which connects a system bus, a memory bus, and the MPU 1001, and a graphic adapter 1005 having a control function of displaying graphic information on a display device 2001 such as a CRT or the like.

Furthermore, the processor 1000 comprises an HDD controller 1006 which serves as an interface with an HDD device 2002, a keyboard controller 1007 which serves as an interface with a keyboard 2003, and a communication I/F 1008. The communication I/F 1008 comprises a parallel interface which controls communications with the image output apparatus 52 according to the IEEE 1284 standard.

Moreover, the display device 2001 (CRT in this example), which presents graphic information and the like to the operator via the graphic adapter 1005, is connected to the processor 1000. In addition, the hard disk drive (HDD) device 2002 and keyboard 2003 are connected to the processor 1000 via the controllers.

On the other hand, the control circuit unit 3013 of the image output apparatus 52 comprises an MCU 3001 which has both a control program execution function and peripheral device control function, and controls the overall image output apparatus 52, and a system bus 3002 which connects respective components in the control circuit unit. Furthermore, the control circuit unit 3013 comprises a gate array (G.A.) which includes, as a control circuit, a function of supplying print data to the print head 3010, a memory address decoding function, a mechanism for generating control pulses to the carrier motor, and the like.

The control circuit unit 3013 comprises a ROM 3004 which stores control programs to be executed by the MCU 3001, host print information, and the like, a DRAM 3005, a communication I/F 3006, and a head driver 3007. The DRAM 3005 saves various data (image print information, print data to be supplied to the head, and the like). The communication I/F 3006 is a parallel interface which controls communications with the host apparatus 51 according to the IEEE 1284 standard. The head driver 3007 converts head print signals output from the gate array into electrical signals for driving the print head 3010.

Furthermore, the control circuit unit 3013 comprises a CR motor driver 3008, and an LF motor driver 3009 which converts feed motor control pulses output from the MCU 3001 into electrical signals used to actually drive the feed motor. The CR motor driver 3008 converts carrier motor control pulses output from the gate array into electrical signals used to actually convert the carrier (CR) motor 3011.

<Generation of Tone Correction Table Using Color Attribute>

Figure 2:
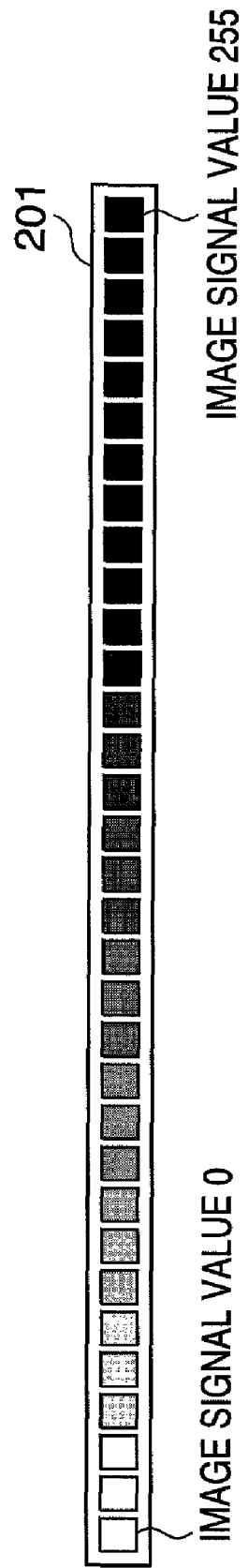
FIG. 2 shows patch patterns for tone characteristic control.

FIG. 2 shows an example of patch patterns which are formed on the sheet surface and are used in tone characteristic correction and calibration. FIG. 2 shows an example of patch patterns of a Bk (black) component, and those of C (cyan), M (magenta), and Y (yellow) color components have the same configuration. In order to form the patch patterns of, for example, the Bk component, a pattern with a given area is printed while the color components other than the Bk component are set to be zero, and the signal value of the Bk component is incremented from zero (lowest density) by a predetermined value. By repeating this process, that is, by increasing the signal value up to 255 (highest density), gradation patterns shown in FIG. 2 are generated. In this embodiment, the gradation patterns are called patch images indicating a plurality of tone levels based on image signals which increase monotonically. As the image signal value becomes larger, the amount of applied ink of a patch pattern on the sheet surface also becomes larger, and the brightness value of each patch decreases. The patch patterns for tone characteristic correction formed on the sheet surface are generated to have 33 tone levels in this embodiment. However, the present invention is not limited to this, and the number of tone levels is not particularly limited.

Figure 3:
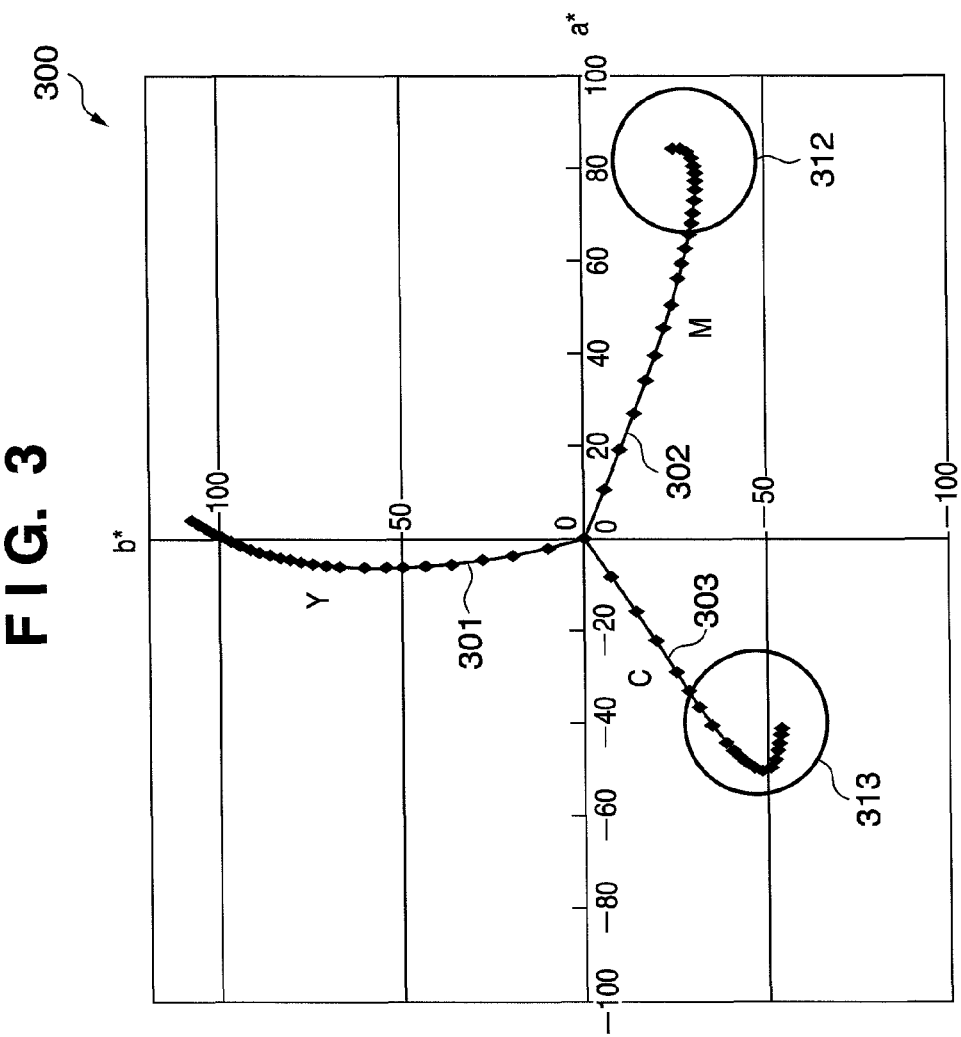
FIG. 3 is a graph showing the calorimetric values of C (cyan), M (magenta), and Y (yellow)

FIG. 3 is a graph of chromaticity information (using a CIE L*a*b* color system) expressed by the calorimetric values for respective patches of C (cyan), M (magenta), and Y (yellow) patch images each indicating a plurality of tone levels based on monotonically increasing image signals shown in FIG. 2. For example, in case of a Y component 301, as a Y signal value increases, corresponding chromaticity levels are plotted upward from the origin in FIG. 3. Each dot represents a chromaticity level at each tone level. As for C and M components 303 and 302, chromaticity levels are plotted in a direction away from the origin with increasing signal value.

Respective color tone correction tables are generated using the patch patterns for tone characteristic correction shown in FIG. 2. For example, in Y (yellow) ink, the difference between the brightness value of a patch (that of an image signal value "0" in FIG. 2) corresponding to a minimum image signal value and that of a patch (that of an image signal value "255" in FIG. 2) corresponding to a maximum image signal value is small. For this reason, if the brightness value, which has a small change amount with respect to a change in image signal value of the Y component, is used as a color attribute as a target for tone correction, the tone reproduction must be realized within a narrow range. Therefore, the brightness difference between neighboring patches (those which have a signal value difference of one level) becomes small, and even when calorimetric errors are not so serious, they impose a larger influence. It is difficult to realize tone reproduction at a higher resolution. In this way, even when an attempt is made to correct the brightness values of image signal values of the Y color component to have linear characteristics, it is difficult to correct precise tone characteristics.

Figure 4:
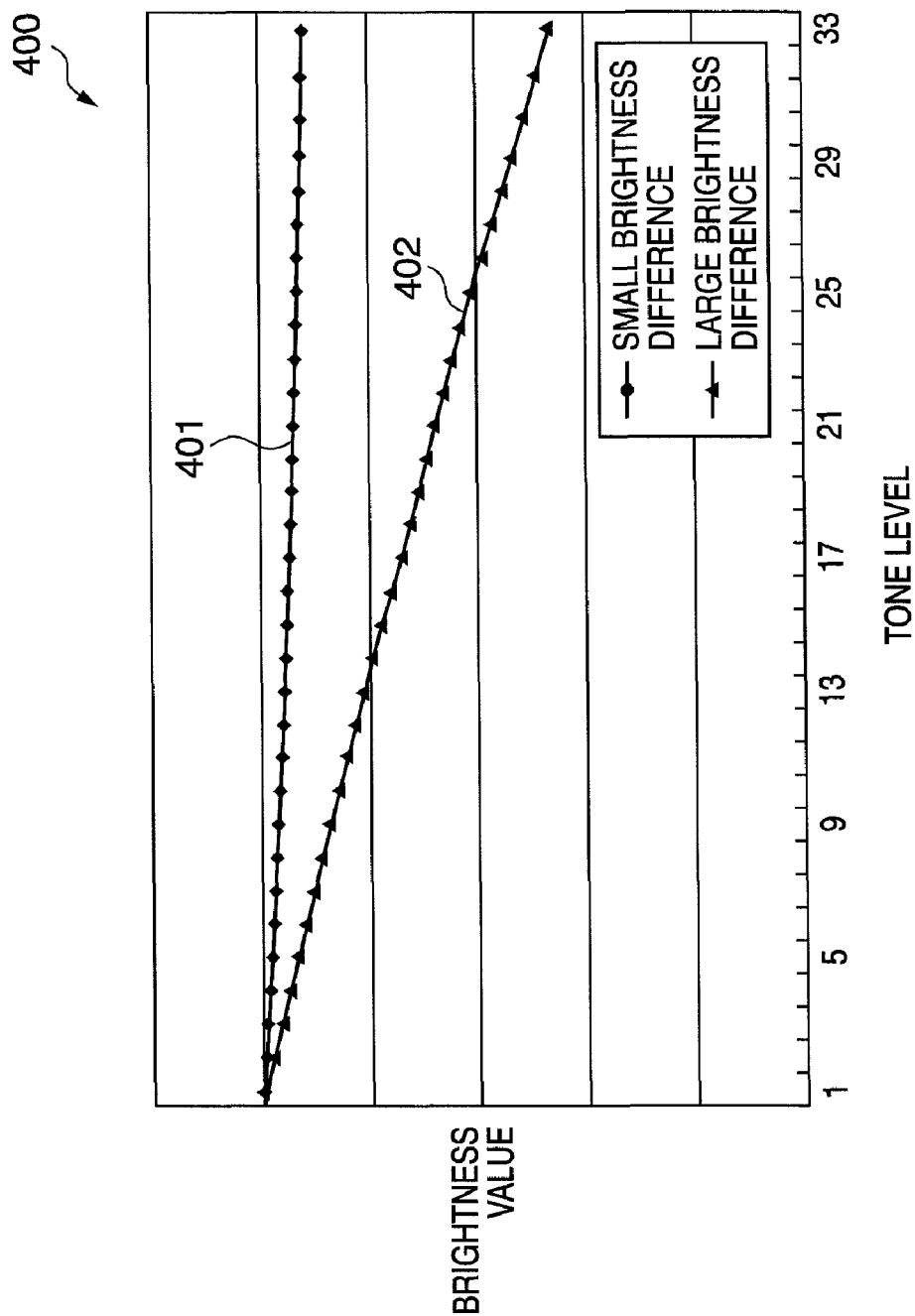
FIG. 4 is a graph illustrating the large and small differences between the brightness values at image signal values "0" and "255"

FIG. 4 is a graph showing the relationship between the tone level (abscissa) and brightness value (ordinate). FIG. 4 represents changes in brightness with respect to image signal values in correspondence with a color component which has a small difference between the brightness value of a patch corresponding to a minimum image signal value and that of a patch corresponding to a maximum image signal value, and a color component which has a large difference between these brightness values. As indicated by a curve 401 in FIG. 4, as for the color component which has a small difference between the brightness value of a patch of an image signal value "0" and that of a patch of an image signal value "255" compared to a curve 402, the brightness value of a given tone level (n) and that of the neighboring tone level (n+1) have no notable difference. In FIG. 4, dots correspond to the patch patterns. For example, when the patch patterns for tone characteristic correction correspond to 33 tone levels, and an image signal is expressed using 8 bits, the tone characteristics must be expanded to 256 tone levels by interpolating neighboring dots of the 33 tone levels. As the interpolation method, linear interpolation is normally used, and luminance values corresponding to image signal values ranging from 0 to 255 are obtained by linearly interpolating about seven dots between neighboring dots of the curve 401. As can be seen from FIG. 4, there is no notable brightness difference even for a tone difference by one level (corresponding to an image signal value '1'). Furthermore, there is no notable difference from another neighboring patch (n+2), either. In this manner, if nearly the same brightness values continue for continuous tone levels, the tone characteristics cannot be precisely expressed if the brightness value is used as an attribute. When errors due to noise or the like occur, the influence of noise is emphasized. For this reason, a tone correction table must be generated using another attribute which changes largely as the tone level changes, for example, a chromatic value or color difference value. In the first to fourth embodiments, the tone correction table is generated using a color attribute such as a chromatic value or color difference value, so that the attribute is corrected to have linear characteristics with respect to an image signal. In this embodiment, the color attribute also includes the color difference value.

Note that the brightness value is expressed by L* in the CIE L*a*b* color system.

The chromatic value is expressed by a distance from the L* axis in the CIE L*a*b* color system. In FIG. 3, this distance corresponds to that from the origin. The chromatic value is described by:

Chromatic value=$\sqrt{(a^{*2}+b^{*2})}$

Using this equation, a chromatic value is calculated for each patch.

The color difference value is expressed by the distance between two points (L1*, a1*, b1*) and (L2*, a2*, b2*) in the CIE L*a*b* color system. The color difference value is described by:

Color difference value=$\sqrt{((L1^*-L2^*)^2+(a1^*-a2^*)^2+(b1^*-b2^*)^2)}$

Using this equation, a color difference value is calculated for each patch. Assume that the color difference value used in this embodiment is obtained by calculating the distance from a point (L*, a*, b*)=(100, 0, 0) or the distance from (L*, a*, b*) values of a specific paper type. That is, in the above equation for the color difference value, the values (100, 0, 0) or the (L*, a*, b*) values of the specific paper type are used as the (L2*, a2*, b2*) values.

Next, assume that attempts are made to generate tone correction tables using chromatic values for C (cyan), M (magenta), as well as Bk (black) and Y (yellow). Upon calculation of a chroma difference between neighboring patches formed using C (cyan) ink or M (magenta) ink, the chromatic value decreases with increasing image signal values (that is, chroma$_{n+1}$–chroma$_n$<0). Note that suffix n is the patch number of the patch pattern, and that number increases as the signal value increases. This is called an inversion of chromatic values (turning phenomenon). Due to the presence of this phenomenon, the chromatic value cannot be used for the C and M components as a means to control the tone characteristics for the following two reasons. First, if such an inversion has occurred, portions with small chroma change ratios with respect to a change in image signal value have formed. Second, if the chromatic values are corrected to have linear characteristics with respect to image signal values, the nonlinearity of another attribute is emphasized adversely, and image quality may be degraded, contrary to the original intention. In FIG. 3, high chromatic portions 313 and 312 of C (cyan) and M (magenta) suffer inversions of chromatic values.

Since the Bk (black) component is an achromatic color, there is no significant change in chromatic value upon an increase in image signal value. For this reason, it is difficult for the Bk component to apply the tone correction using chromatic values for the same reason as that for the difficulty in correction using the brightness values for the Y component. For these reasons, the tone correction tables cannot be generated using chromatic values for C (cyan), M (magenta), and Bk (black). On the other hand, since these color components have a sufficiently large difference between the brightness value of a patch with a minimum image signal value and that of a patch with a maximum image signal value, tone correction tables can be generated using the brightness values.

Figure 5A:
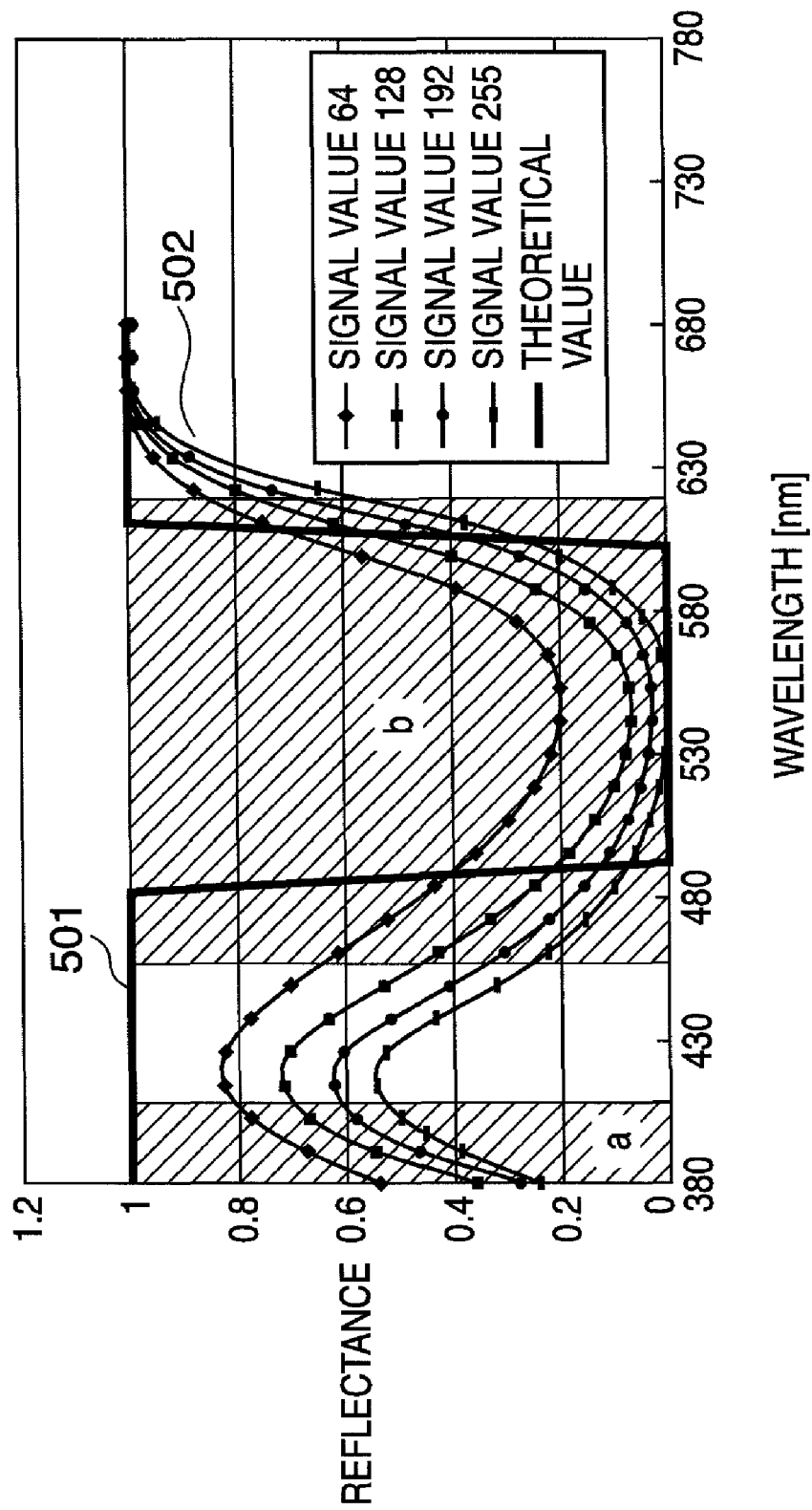
FIG. 5A is a graph of M (magenta) reflection spectra.
Figure 5B:
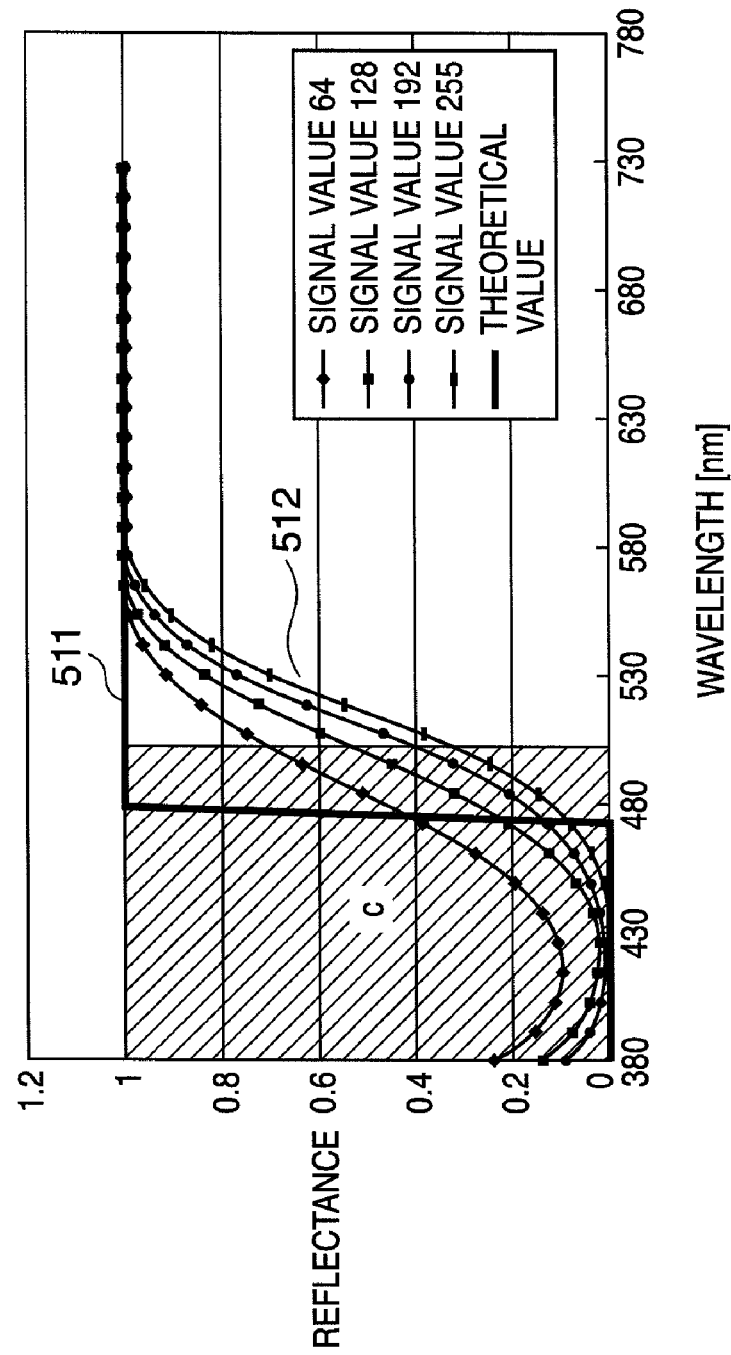
FIG. 5B is a graph of Y (yellow) reflection spectra.

A cause of the inversion of chromatic values, as shown in FIG. 3, will be described below. FIG. 5A shows, for the M (magenta) component, spectral reflection spectra 502 of color patches formed in correspondence with image signal values "0", "64", "128", "192", and "255", and an ideal spectral reflection spectrum 501. Likewise, FIG. 5B shows, for the Y (yellow) components, spectral reflection spectra 512 of color patches formed in correspondence with image signal values "0", "64", "128", "192", and "255", and an ideal spectral reflection spectrum 511. As shown in FIG. 3, the inversion of chromatic values occurs for a color (e.g., M (magenta)) having two or more absorption peaks of the spectral reflection spectrum. As can be seen from FIG. 5A, wavelengths in regions (a) and (b) do not have any relationship in which the reflectance changes by the same amount according to a change in image signal value. For this reason, when an image signal value changes, the shape of the spectral reflection spectrum also changes. That is, a hue value changes according to the image signal value, thus causing an inversion of chromatic values.

On the other hand, even in a color having one absorption peak of the spectral reflection spectrum, for example, Y (yellow) in FIG. 5B, wavelengths in region (c) do not have any relationship in which the reflectance changes by the same amount according to a change in image signal value. However, when the number of absorption peaks is one, neither the frequency component ratio of absorption peaks nor the hue value change, and the inversion of chromatic value never occurs.

As described above, the spectral reflection spectra are obtained, and an optimal method of generating a tone correction table can be determined based on the number of absorption peaks. That is, the criteria for selecting the method are: (1) color attributes (chroma, brightness, color difference, and the like) that have a small change ratio upon change in image signal value are not used, and (2) tone correction using chromatic values is not performed for a color which has a plurality of absorption peaks of the spectral reflection spectrum or a color which has no absorption peak. The small change ratio upon change in image signal value includes a state in which the attribute saturates.

<Selection Sequence of Tone Correction Table Generation Method>

Figure 6A:
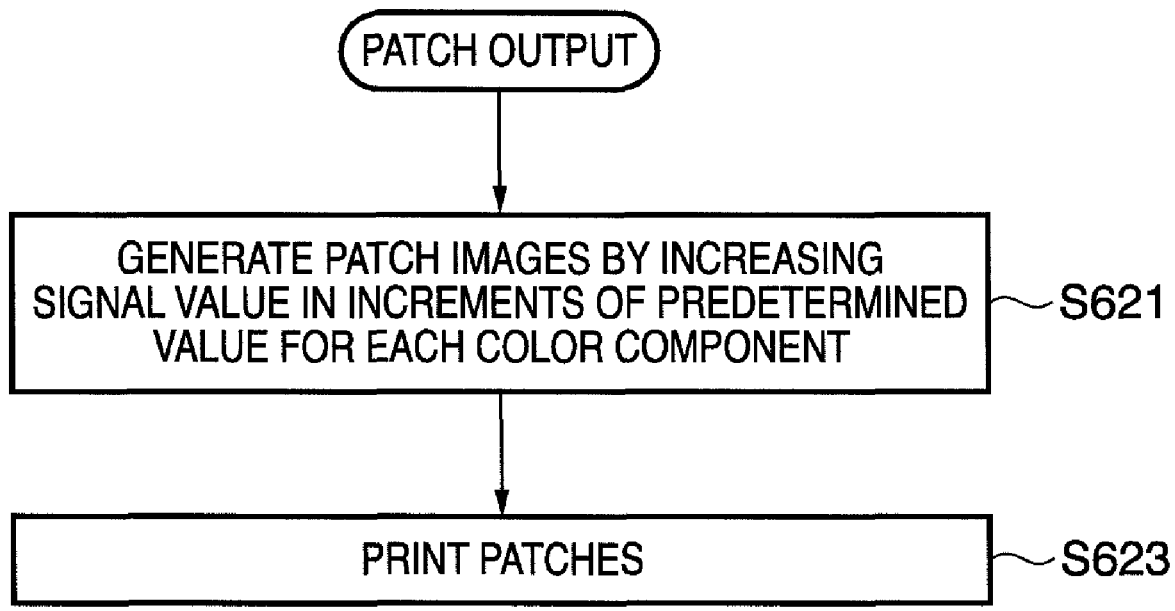
FIG. 6A is a flowchart of the first embodiment.
Figure 6B:
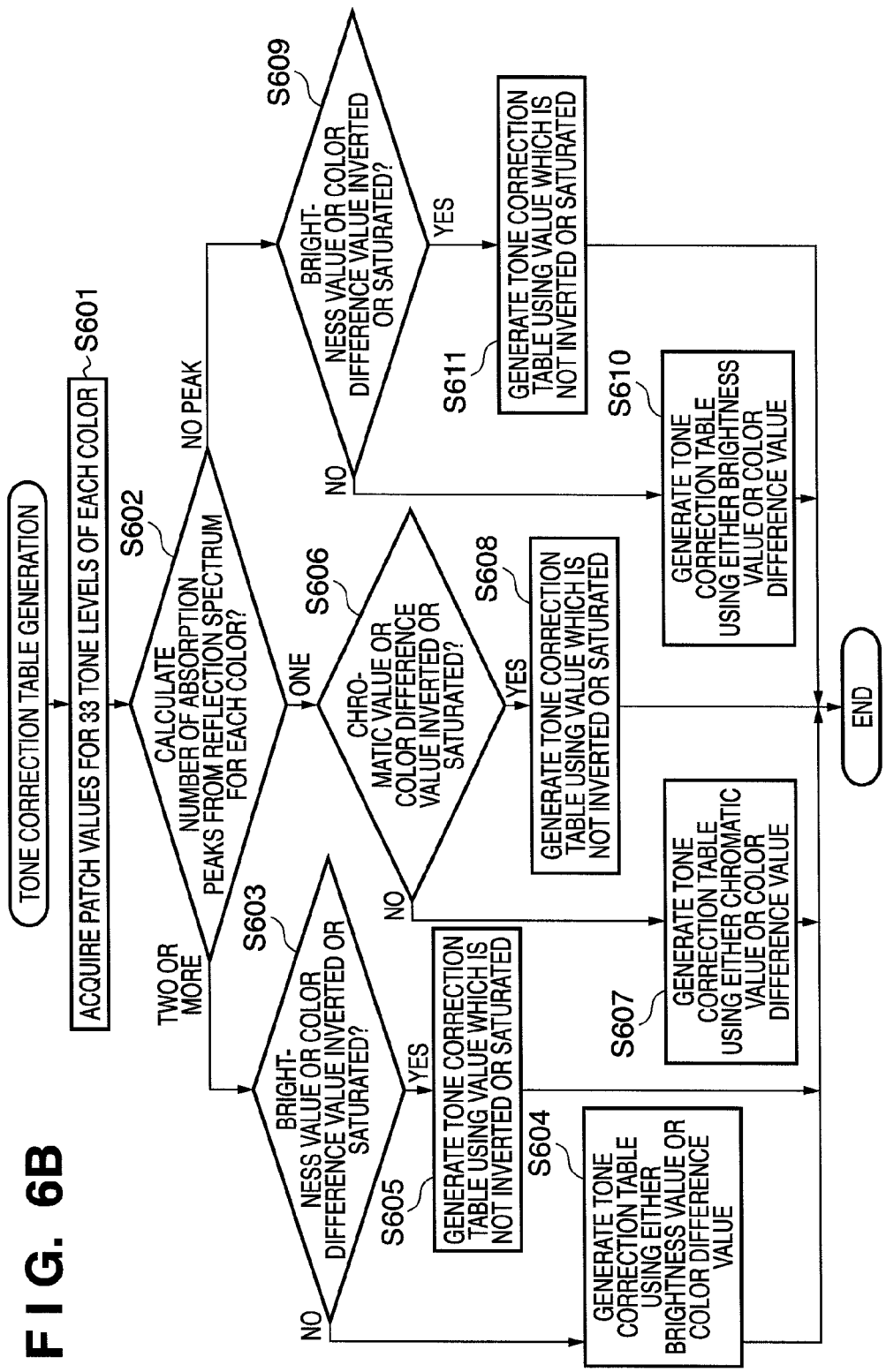
FIG. 6B is a flowchart of the first embodiment.

FIGS. 6A and 6B are flowcharts of the processing for obtaining the spectral reflection spectra of respective ink colors and determining a tone correction table generation method based on the number of absorption peaks of each spectral reflection spectrum in this embodiment. The processing of these flowcharts is implemented by the host apparatus 51 and image output apparatus 52, when the program in the HDD 2002 is executed under the control of the MPU 1001.

In the sequence of FIG. 6A, the image output apparatus 52 forms patch patterns for tone characteristic correction shown in FIG. 2 on the sheet surface in correspondence with respective component colors. That is, the MPU 1001 generates image data of patch patterns (S621). For this purpose, image data of a pattern of a uniform color, which has a given area, is generated while the values (which will be referred to as color signal values hereinafter) of colors other than the color component of interest are set to zero, and the signal value of the color component of interest is set to an initial value (e.g., 0). Then, similar image patterns are generated by incrementing the signal value by a predetermined value, and are arranged in series. Also, similar image patterns are generated for all the color components by changing the color component of interest.

In step S623, the MPU 1001 forms and outputs the patch patterns generated in step S621 on a print medium.

In FIG. 6B, a tone correction table is generated based on the printed patch patterns. FIG. 6B shows the processing for a certain component color, which is repeated for a color printer in correspondence with a plurality of color components.

The MPU 1001 measures the colors of the patch patterns output in step S623 to acquire colorimetric values (S601). The colorimetric values can be acquired, for example, by a method of measuring color patches by a calorimeter, and operator input of the measurement results. Alternatively, a colorimeter may be connected to the image output apparatus 52 (printer or host apparatus main body 51 (computer), and the measurement results may be loaded via a connected interface. The acquired colorimetric values include brightness values, chromatic values, and spectral reflectance spectra for respective patches. The spectral reflectance spectra need not be acquired for all patches, but may be acquired from one patch (for example, a patch with a highest tone level) per color component. Since the acquired colorimetric values must be associated with signal values for respective patches, they are input in turn from the calorimetric value of a pattern corresponding to a small signal value. If the tone levels of patches are common to all the color components, since the patch colors are specified from the spectral reflection spectra, color information need not be input.

Note that the MPU 1001 not only loads the calorimetric values but also interpolates those corresponding to signal values whose patches are not generated in step S601. Since the patch patterns for tone characteristic correction shown in FIG. 2 correspond to 33 tone levels, neighboring measurement values of patches corresponding to closest signal values undergo mathematical processing such as linear approximation, quadratic approximation, spline interpolation, or the like, thereby interpolating all the tone levels that can be expressed by image signal values.

Next, the MPU 100 calculates the number of absorption peaks of the spectral reflection spectrum of a patch corresponding to the image signal value "255" for each color component. In this embodiment, the color components are classified into those which have two or more absorption peaks of the spectral reflection spectrum such as cyan and magenta, those which have one absorption peak of the spectral reflection spectrum such as yellow, and those which have no absorption peak of the spectral reflection spectrum such as black. The MPU 1001 then checks the number of absorption peaks (S602).

Figure 7:
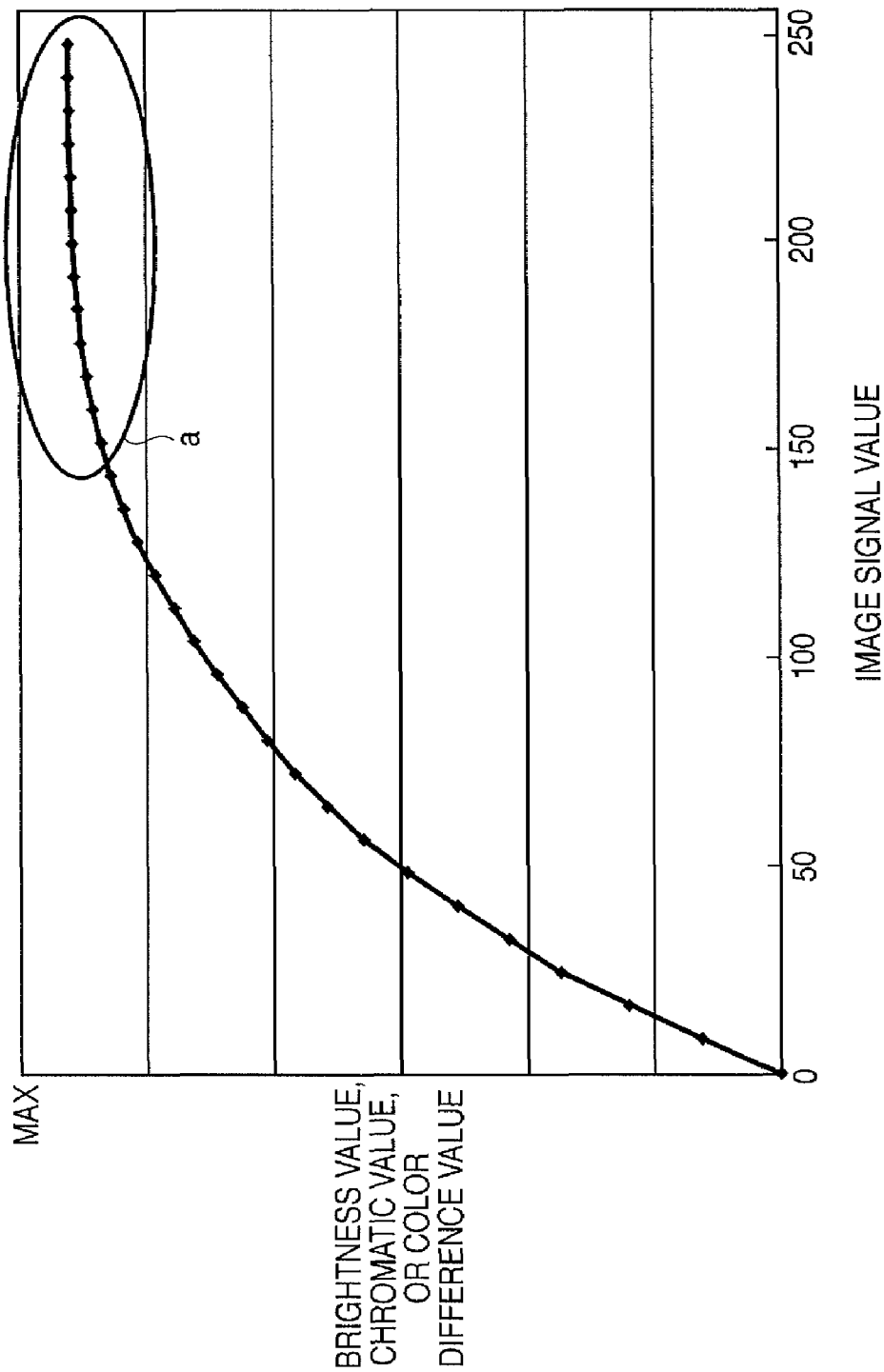
FIG. 7 is a graph for explaining saturation.

If the number of absorption peaks of the spectral reflection spectrum is two or more, since an inversion of chromatic values occurs, a brightness value or color difference value is selected as an attribute used in generation of a tone correction table. Hence, the MPU 1001 then checks if the brightness values and color difference values cause any inversion or saturation in accordance with an increase in image signal value (S603). Saturation indicates that the brightness values, chromatic values, or color difference values on the ordinate do not increase in accordance with an increase in image signal value on the abscissa, identical values or close values appear consecutively, and the value reaches an upper limit, as indicated by "a" in FIG. 7.

If neither the brightness values nor the color difference values cause any inversion or saturation of values in accordance with an increase in image signal value, the MPU 1001 generates, using either of the brightness values or color difference values, a tone correction table which realizes brightness linearity or color difference linearity as tone characteristics (S604). If either the brightness values or color difference values cause any inversion or saturation upon an increase in image signal value, the MPU 1001 generates, using an attribute which causes neither an inversion nor saturation, a tone correction table which realizes linear tone characteristics of that attribute (S605).

Note that brightness linearity refers to tone characteristics in which the brightness value changes linearly in accordance with a change in image signal value. Likewise, chroma linearity refers to tone characteristics in which the chromatic value changes linearly in accordance with a change in image signal value. Also, color difference linearity refers to tone characteristics in which the color difference value changes linearly in accordance with a change in image signal value.

If the number of absorption peaks of the spectral reflection spectrum is one, for example, as is the case with Y (yellow), a precise tone change cannot be detected even by taking a brightness change into account since the brightness change amount is small. For this reason, the chromatic value or color difference value are selected as an attribute used in generation of a tone correction table. Hence, the MPU 1001 checks if the chromatic values and color difference values cause any inversion or saturation upon an increase in image signal value (S606). If neither the chromatic values nor color difference values cause any inversion or saturation of values in accordance with an increase in image signal value, the MPU 1001 generates, using either the chromatic values or color difference values, a tone correction table which realizes chroma linearity or color difference linearity as tone characteristics (S607). If either the chromatic values or color difference values cause any inversion or saturation of values upon an increase in image signal value, the MPU 1001 generates, using an attribute which causes neither an inversion nor saturation, a tone correction table which realizes linear tone characteristics of that attribute (S608).

If the spectral reflection spectrum includes no absorption peak in step S602, the brightness value or color difference is selected as an attribute used in generation of a tone correction table, since a chroma change is small due to an achromatic ink such as Bk (black) or the like. Hence, the MPU 1001 then checks if the brightness values and color difference values cause any inversion or saturation in accordance with an increase in image signal value (S609). If neither the brightness values nor the color difference values cause any inversion or saturation of values in accordance with an increase in image signal value, the MPU 1001 generates, using either of the brightness values or color difference values, a tone correction table which realizes brightness linearity or color difference linearity as tone characteristics (S610). If either the brightness values or color difference values cause any inversion or saturation upon an increase in image signal value, the MPU 1001 generates, using an attribute which causes neither an inversion nor saturation, a tone correction table which realizes linear tone characteristics of that attribute (S611).

Note that the present invention is not limited to correction of linear tone characteristics. The present invention may be applied to correction of nonlinear characteristics as long as a tone correction table that corrects the tone characteristics of target characteristics can be generated.

If there are two or more attributes that can be used in generation of a tone correction table, the table can be generated using either of these attributes. As a selection criterion, an attribute which has a larger difference between attribute values corresponding to maximum and minimum signal values may be selected. For example, assume that either two attributes, that is, chromatic values and color difference values, can be used in the generation of a tone correction table. In this case, the difference between chromatic values corresponding to a maximum signal value (e.g., 255) and minimum signal value (e.g., 0) is compared with that between color difference values corresponding to these signal values. Then, a tone correction table is generated using the attribute having the larger difference. In this way, a tone correction table can be generated with higher precision.

As described above, when this embodiment is used, an optimal tone correction table generation method can be selected in consideration of the optical characteristics of respective ink colors, and precise tone reproduction can be realized.

In this embodiment, in order to acquire the number of absorption peaks in the spectral reflectance spectrum, the spectral reflectance spectrum at the image signal value "255" is used. However, the shape of the spectral reflectance spectrum of a patch of any image signal value may be examined. It is more preferable to use the spectral reflectance spectrum of a patch corresponding to an image signal value falling within the ink receivable range.

In the above example, the spectral reflectance spectra are acquired as the calorimetric values. Alternatively, the spectral reflection spectra of inks used in a printer may be measured in advance, the numbers of absorption peaks in these spectra may be counted, and these inks may be classified in advance into a color with two or more absorption peaks, that with one absorption peak, and that with no absorption peak and may be stored in the HDD 2002 of the host apparatus 51. In step S601, identification information indicating the color of interest or the number of absorption peaks of the spectral reflection spectrum is input together with the colorimetric values of the color of interest in place of the spectral reflectance spectrum. In this case, if the identification information indicating the color of interest is input, and if that color is C or M in step S602, the process branches to step S603; if the color is Y, the process branches to step S606; or if the color is Bk, the process branches to step S609. Alternatively, if the number of absorption peaks is input, the process branches according to the checking result in step S602 in FIG. 6B.

Since step S609 and subsequent steps are the same as step S603 and subsequent steps, if it is determined in step S602 that the number of absorption peaks is two or more or zero, the process may branch to step S603. In this case, step S609 and subsequent steps may be omitted.

Second Embodiment

The second embodiment of the present invention will be described in detail hereinafter with reference to the accompanying drawings. The first embodiment has explained the method of generating a tone correction table for Y (yellow), for example, using chromatic values or color difference values, since Y has a small brightness change amount and precise tone reproduction cannot be realized due to the influence of errors. On the other hand, in the above description, if a tone correction table for C (cyan) or M (magenta) is generated using chromatic values as in Y (yellow), the chroma difference between neighboring patches becomes negative as an image signal value increases. For this reason, an inversion of chromatic values occurs with respect to image signal values and a tone correction table for C or M cannot be generated using the chromatic values. Hence, in the above example, since ink colors respectively have different characteristics, the tone correction table generation method is selected based on the number of absorption peaks of the spectral reflectance spectrum in each ink color.

This embodiment focuses on the fact that precise tone detection using brightness values cannot be realized due to the influence of errors since Y (yellow) has a small brightness change amount. Then, as for patch images corresponding to a plurality of tone levels obtained by monotonically increasing an image signal in increments of a predetermined value, it is checked if the difference between the brightness values of a patch corresponding to a minimum image signal value and that corresponding to a maximum image signal value satisfies a predetermined value. The fact that the difference satisfies the predetermined value means that the difference between the maximum and minimum values is greater than or equal to the predetermined value. If the difference between the brightness values satisfies the predetermined value, a tone correction table is generated using the brightness values or color difference values; otherwise, a tone correction table is generated using chromatic values or color difference values.

The fact that the brightness difference satisfies the predetermined value means that the difference between the brightness value corresponding to the image signal value "0" and that corresponding to the image signal value "255" is greater than or equal to the predetermined value, as indicated by the curve 401 in FIG. 4, as described above. If this difference is not greater than or equal to the predetermined value, the brightness values are not adopted as a correction target attribute for the same reason as that the brightness values cannot be used as a correction target attribute for the Y (yellow) component. That is, since there is no notable difference between neighboring patches, if nearly the same brightness values appear consecutively with respect to continuous tone levels, precise tone detection is disabled, thus causing errors.

As for an ink of a color which has a large difference between the brightness value corresponding to the image signal value "0" and that corresponding to the image signal value "255", as indicated by the curve 402 in FIG. 4, a change in brightness difference is large when the image signal value changes by a unit value, thus realizing precise tone detection. This is the case when the brightness difference satisfies the predetermined value.

Figure 8:
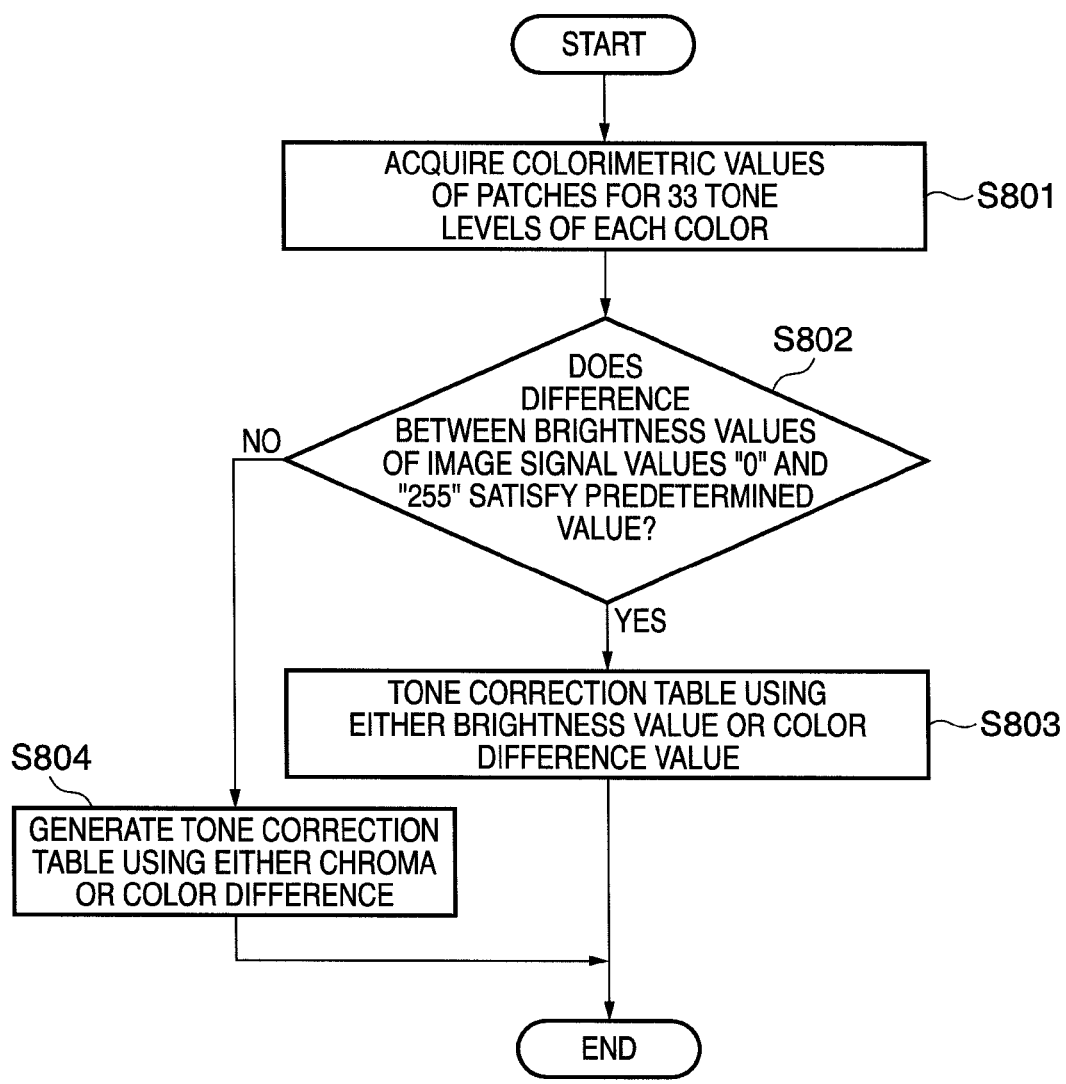
FIG. 8 is a flowchart of the second embodiment.

FIG. 8 is a flowchart of the processing for determining if the brightness difference satisfies the predetermined value in this embodiment. The processing of this flowchart is implemented by the host apparatus 51 and image output apparatus 52 when the program in the HDD 2002 is executed under the control of the MPU 1001.

The image output apparatus 52 forms, for respective colors, patch patterns for tone characteristic correction shown in FIG. 2 on the sheet surface. This process is done in the sequence shown in FIG. 6A. Then, referring to FIG. 8, the MPU 1001 acquires the calorimetric values of the patch patterns, that is, the brightness values and chromatic value values for respective patches (S801). At this time, the MPU 1001 executes interpolation processing of the brightness values corresponding to 33 tone levels to estimate and calculate brightness values between neighboring tone levels, thereby obtaining 256 tone levels. The MPU 1001 checks if the brightness difference satisfies the predetermined value (S802). If the brightness difference satisfies the predetermined value, the MPU 1001 selects a tone correction table generation method using either the brightness values or color difference values as an attribute (S803). This tone correction table corrects image signal values to attain brightness linearity or color difference linearity. If the brightness difference does not satisfy the predetermined value, the MPU 1001 selects a tone correction table generation method using either the chromatic values or color difference values as an attribute (S804). This tone correction table corrects image signal values to attain chroma linearity or color difference linearity.

Note that the present invention is not limited to correction of linear tone characteristics. The present invention may be applied to correction of nonlinear characteristics as long as a tone correction table that corrects the tone characteristics of target characteristics can be generated.

The tone correction table generation method and the correction method of image signals using the tone correction table are the same as those in the first embodiment.

As described above, according to this embodiment, as for a color in which the brightness difference between patches corresponding to minimum and maximum image signal values is smaller than a predetermined value in association with patch images corresponding to a plurality of tone levels, a tone correction table is generated using chromatic values or color difference values. In this way, precise tone reproduction can be realized.

Third Embodiment

The first and second embodiments have explained the method of determining an optimal generation method of a tone correction table. This embodiment will explain, as an application example, a method of selecting a method of converting a tone correction table for each ink color using the method of determining the tone correction table generation method described in the first and second embodiments, and executing calibration by the selected method.

Figure 9:
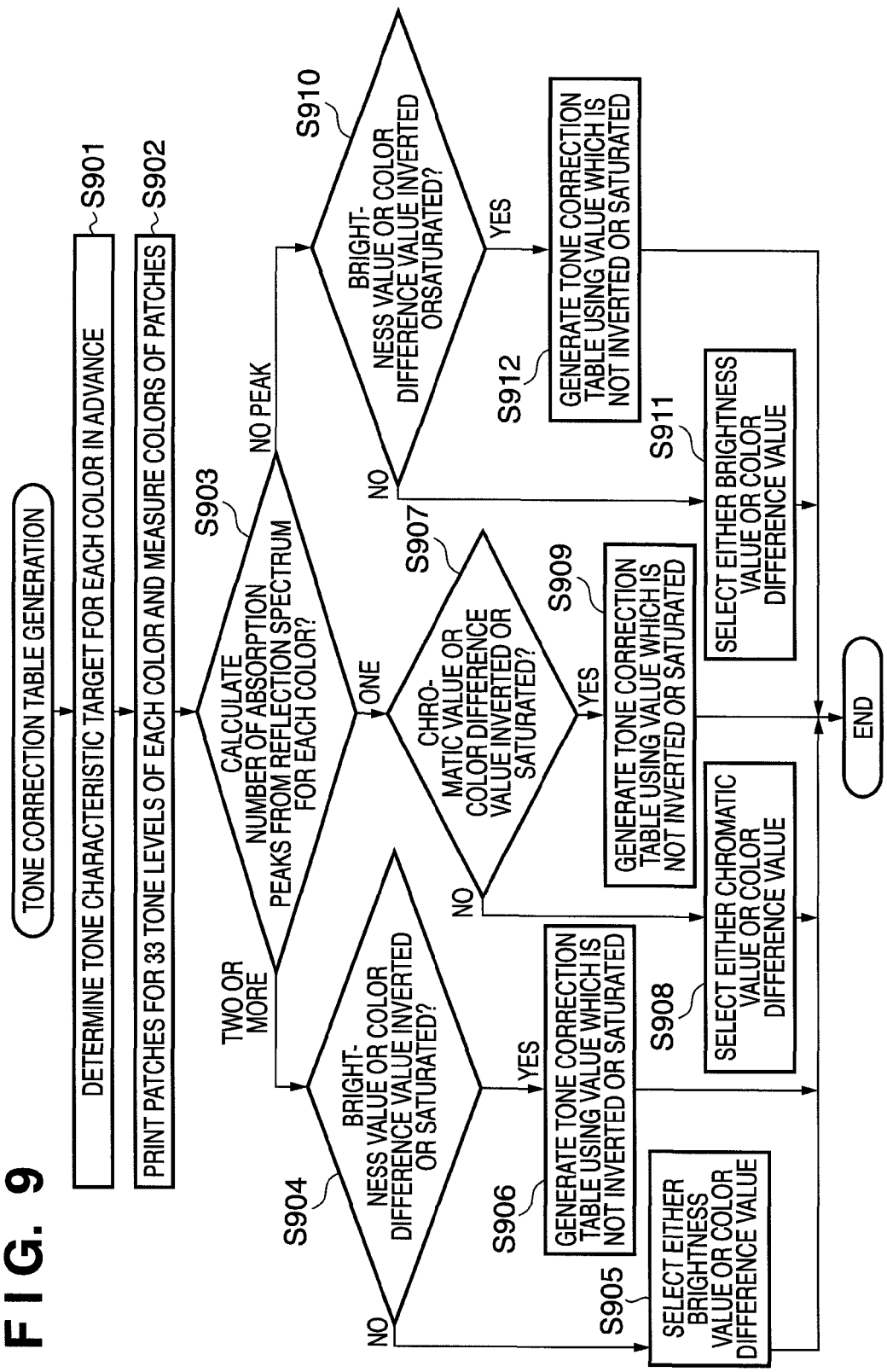
FIG. 9 is a flowchart of the third embodiment.

FIG. 9 is a flowchart of the processing for selecting a method used in calibration for generating or updating a tone correction table. Tone characteristic targets of the brightness values, chromatic values, and color difference values of C (cyan), M (magenta), Y (yellow), and Bk (black) are set in advance (S901). This target corresponds to desired tone characteristics after calibration, and may be arbitrarily selected values upon execution of calibration, values of a virtual color image forming apparatus, and the like in addition to values established when designing ideal tone characteristics of an image processor of a color image forming apparatus.

The image output apparatus 52 forms, for respective colors, patch patterns for tone characteristic correction shown in FIG. 2 on the sheet surface. The colors of the formed patches are measured to acquire the brightness values, chromatic values, and spectral reflectance spectra for respective patches (S902). The numbers of absorption peaks are obtained from the spectral reflectance spectra (S903). In this embodiment, C (cyan) and M (magenta) are classified as colors which have two or more absorption peaks in the spectral reflectance spectrum, Y (yellow) is classified as a color which has one absorption peak in the spectral reflectance spectrum, and Bk (black) is classified as a color which has no absorption peak in the spectral reflectance spectrum.

If the number of absorption peaks in the spectral reflectance spectrum is two or more, the MPU 1001 checks using brightness values or color difference values if the brightness values and color difference values cause any inversion or saturation of values in accordance with an increase in image signal value (S904). If neither the brightness values nor color difference values cause any inversion or saturation of values in accordance with an increase in image signal value, the MPU 1001 selects either the brightness values or color difference values as an attribute used to update a tone correction table (S905). If either the brightness values or color difference values cause any inversion or saturation of values in accordance with an increase in image signal value, the MPU 1001 selects an attribute which causes neither an inversion nor saturation as an attribute used to update a tone correction table (S906).

If the number of absorption peaks in the reflection spectrum is one, the MPU 1001 uses either chromatic values or color difference values to determine if the chromatic values and color difference values cause any inversion or saturation of values in accordance with an increase in image signal value (S907). If neither the chromatic values nor the color difference values cause any inversion or saturation of values in accordance with an increase in image signal value, the MPU 1001 selects either the chromatic values or color difference values as an attribute used to update a tone correction table (S908). If either the chromatic values or color difference values do cause any inversion or saturation in accordance with an increase in image signal value, the MPU 1001 selects an attribute which causes neither an inversion nor saturation as an attribute used to update a tone correction table (S909).

If the number of absorption peaks in the reflection spectrum is zero, the MPU 1001 checks using brightness values or color difference values if the brightness values and color difference values cause any inversion or saturation of values in accordance with an increase in image signal value (S910). If neither the brightness values nor color difference values cause any inversion or saturation of values in accordance with an increase in image signal value, the MPU 1001 selects either the brightness values or color difference values as an attribute used to update a tone correction table (S911). If either the brightness values or color difference values cause any inversion or saturation of values in accordance with an increase in image signal value, the MPU 1001 selects an attribute which causes neither an inversion nor saturation as an attribute used to update a tone correction table (S912).

As described above, an optimal calibration method can be selected in consideration of the optical characteristics or brightness values of each ink color, and precise calibration can be realized.

Figure 10:
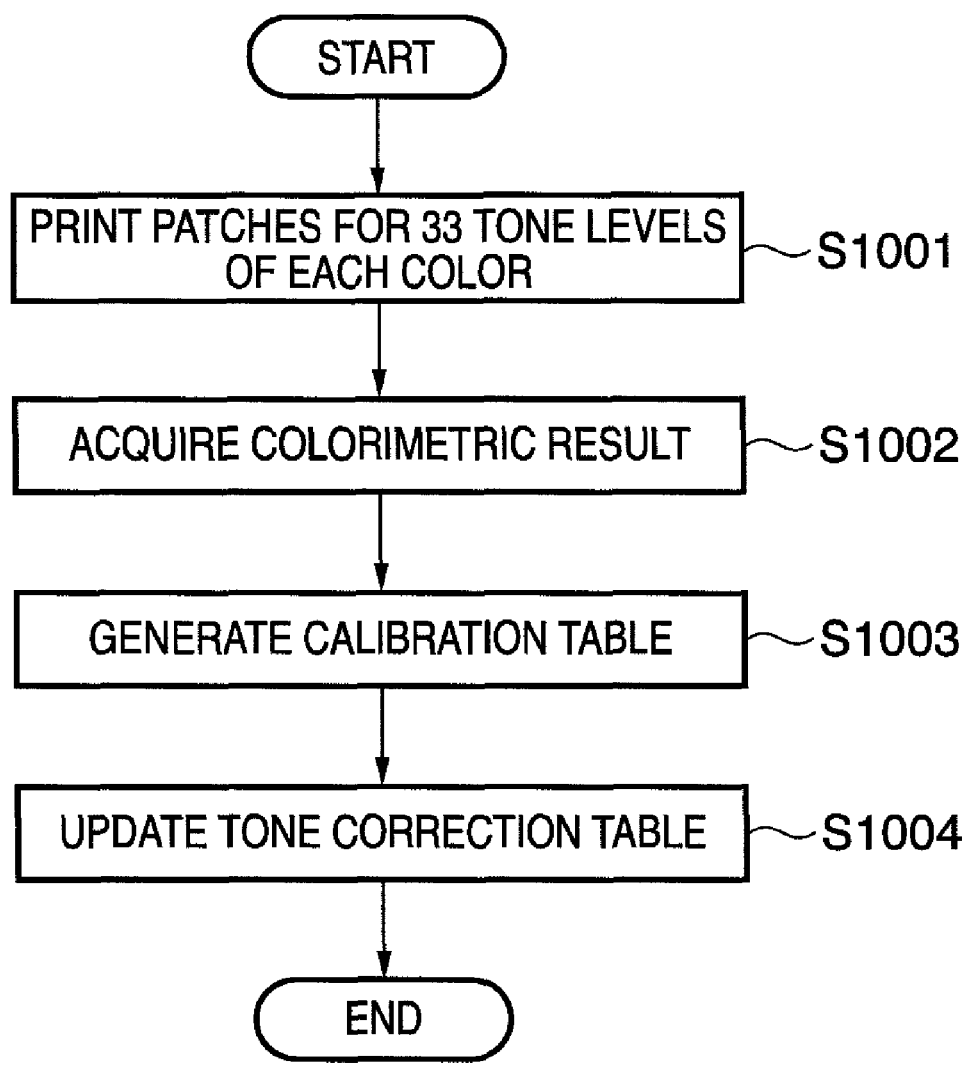
FIG. 10 is a flowchart of execution of calibration.

The tone correction table is updated (calibrated) by the method (i.e., the attribute) selected in the sequence of FIG. 9. Referring to FIG. 10, the attribute selected for each color in the sequence of FIG. 9 is also selected for each color in calibration. Of course, a target characteristic curve represents characteristics for the attribute selected for each color. Details will be explained using the flowchart of FIG. 10. The sequence in FIG. 10 may be executed in succession to that in FIG. 9. FIG. 10 includes a step of printing patches for 33 tone levels per color on the sheet surface (S1001), and a step of acquiring calorimetric results from a calorimeter (S1002). Note that the patch patterns are printed based on image signals which are corrected by an existing tone correction table which associates image signal values s before correction with image signal values s' after correction.

Subsequently, a calibration table is generated based on the obtained calorimetric results (S1003).

Figure 11:
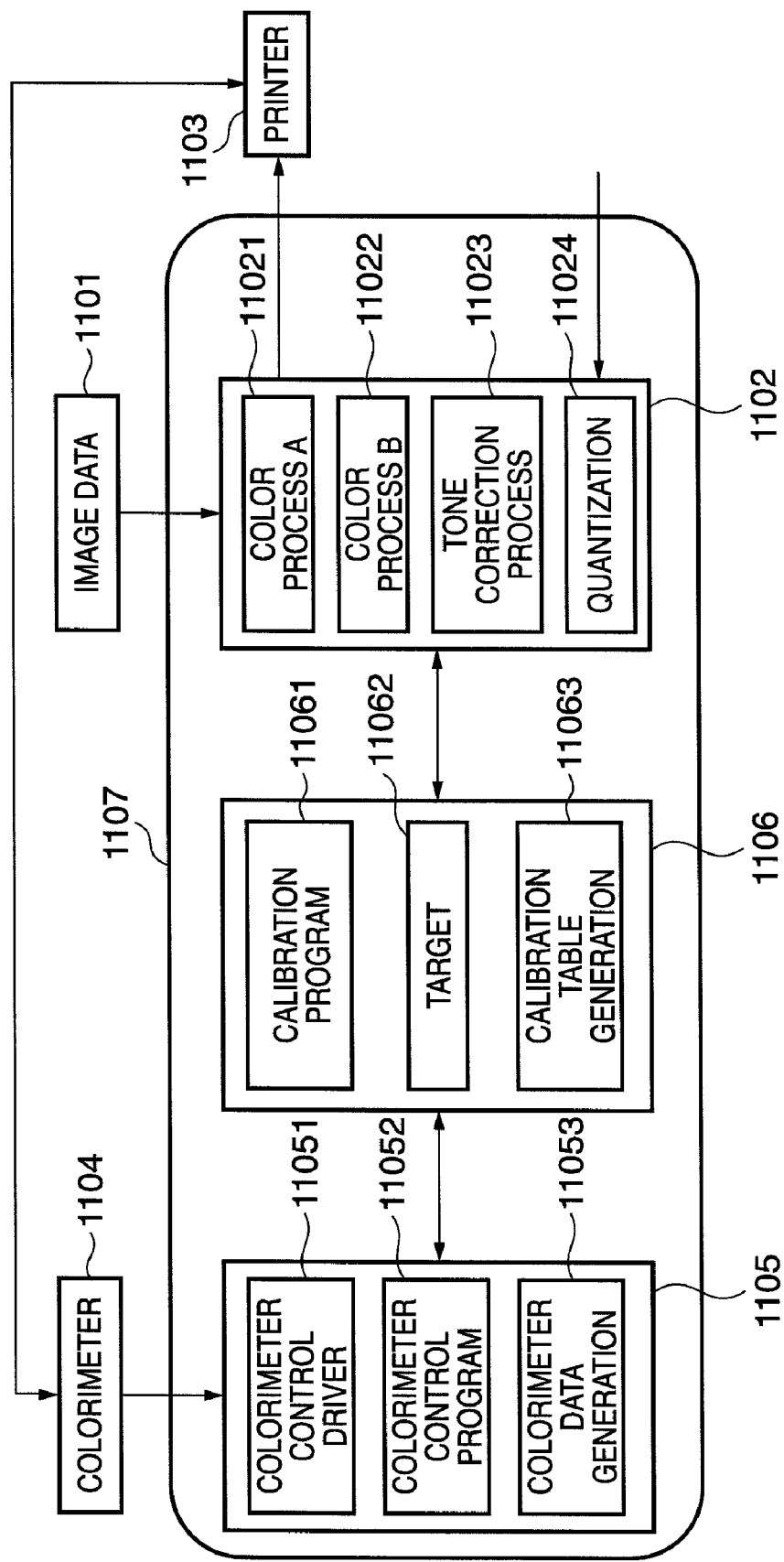
FIG. 11 is a block diagram showing the arrangement of a printing system according to the third embodiment.

FIG. 11 is a block diagram showing the arrangement of a printing system of this embodiment. A printer 1103, a personal computer (PC) 1107 as a host apparatus, and a colorimeter 1104 are connected to each other, and an image processor 1102, colorimetry manager 1105, and calibration manager 1106 are implemented as software modules on the PC.

Upon execution of calibration, patch patterns for tone characteristic correction are input as image data 1101. The image processor 1102 applies image processing to the input image. The image processor 1102 comprises a color process A module 11021, color process B module 11022, tone correction processing module 11023, and quantization module 11024 like that shown in FIG. 1. In the image processor 1102, the input image data 1101 of the patch patterns for tone correction does not undergo processing by the color process A module 11021. The color process B module 11022 converts R, G, and B data of the input image into signals C1 (cyan), M1 (magenta), Y1 (yellow), and Bk1 (black). The tone correction processing module 11023 using tone correction tables applies tone correction to the image signals C1, M1, Y1, and Bk1 to obtain image signals C2, M2, Y2, and Bk2 after tone correction. The quantization module 11024 quantizes the image signals C2, M2, Y2, and Bk2 after tone correction to obtain quantized image signals C3, M3, Y3, and Bk3. The image processor 1102 processes the input image data 1101, and the printer 1103 outputs the processed image data. The colorimeter 1104 measures the colors of the patch patterns output by the printer 1103. The colorimetry of chromaticity information (L*a*b*) of the patches by the colorimeter 1104 is controlled in the colorimetry manager 1105 based on a colorimeter control driver 11051 and colorimeter control program 11052, and a colorimetric value data generation module 11053 generates calorimetric value data. The calorimetric value data of the patch patterns obtained by the colorimetry manager 1105 are passed to the calibration manager 1106. The calibration manager 1106 comprises a calibration program 11061, target 11062, and calibration table generation module 11063.

Figure 12:
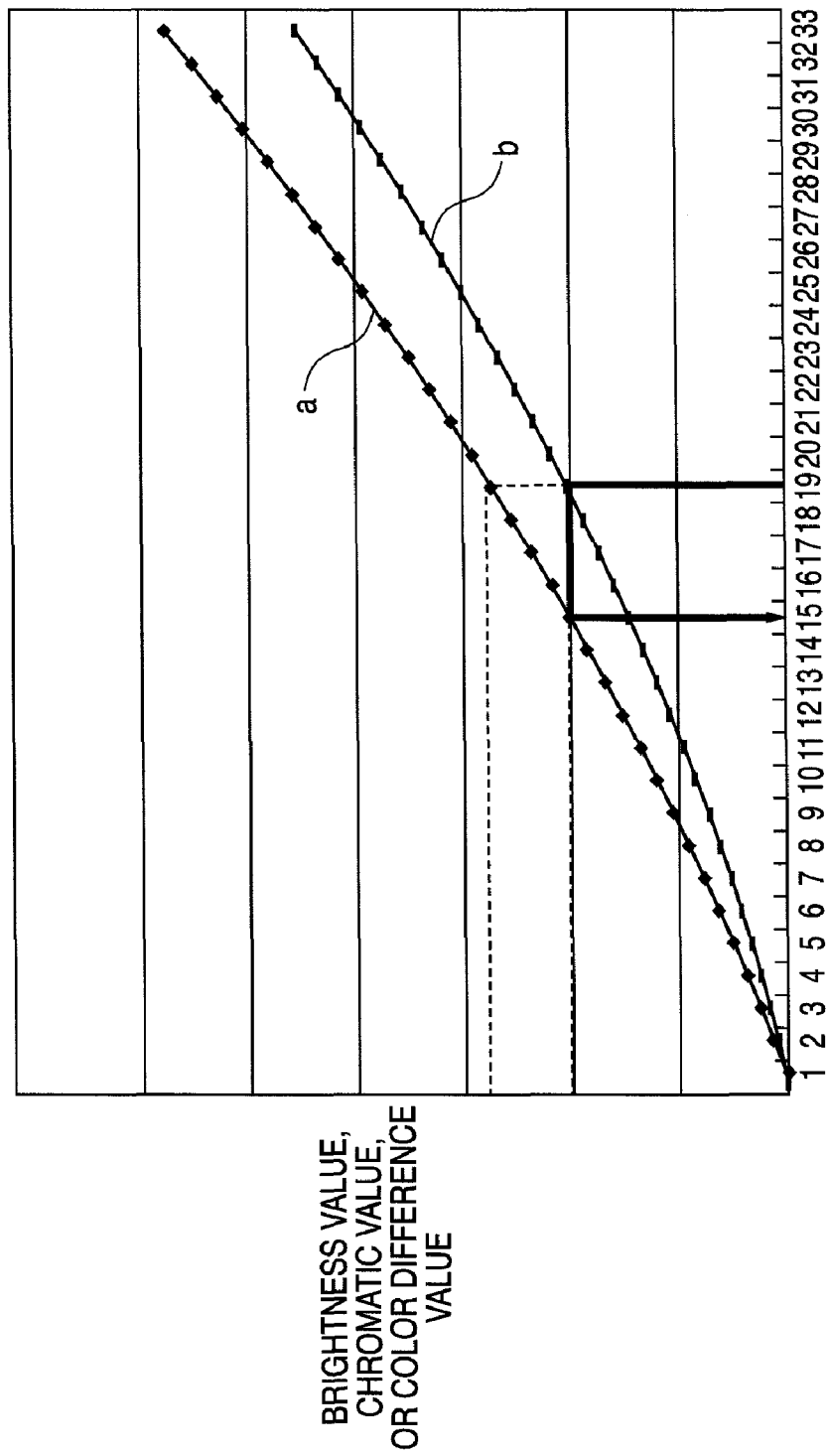
FIG. 12 is a graph showing a method of generating a calibration table.

The method of generating the calibration table will be described below with reference to FIG. 12. The abscissa plots the tone levels, and the ordinate plots the brightness values, chromatic values, or color difference values. A curve (a) in FIG. 12 represents target values, and a curve (b) in FIG. 12 represents an example of tone characteristics in a specimen for which calibration is actually done. The tone characteristics in FIG. 12 may be either linear or nonlinear. Patch patterns for tone characteristic correction for 33 tone levels include a target value of the selected attribute corresponding to a tone level "15". The attribute value of the specimen for which the selected calibration is performed on the target at tone level "15" is small; the tone level must be updated to 19 in order to obtain the same attribute value as the target at tone level "15". The same process is repeated for a plurality of tone levels, thus generating a calibration table.

The calibration table generated by the calibration manager 1106 replaces the tone correction table used in the tone correction processing module 11023 in the image processor 1102. With the above process, by changing the tone correction table in an arbitrary specimen, calibration is executed.

In this embodiment, the image processor, colorimetry manager, and calibration manager are implemented as software modules of the PC, but may be embedded as software in the printer.

In this embodiment, the attribute used in generation (or update) of the tone correction table is determined in the sequence of the first embodiment. However, the attribute may be determined in the sequence of the second embodiment.

Fourth Embodiment

The first and second embodiments have explained the method of determining an optimal generation method of a tone correction table. The third embodiment has explained the example of the system configuration which executes calibration by updating the tone correction table after application of the method of generating the tone correction table for each color in the first and second embodiments.

This embodiment will explain the following example. That is, since a brightness change amount is small in, for example, Y (yellow), precise tone reproduction cannot be realized due to the influence of errors. Hence, the difference between the brightness values of patches which respectively correspond to minimum and maximum image signal values, and that between the chromatic values, and the color difference value are calculated, and the three values are ranked according to their magnitudes. Then, a tone correction table for each color is generated or calibration is executed to update the tone correction table using an attribute with a largest difference.

Figure 13:
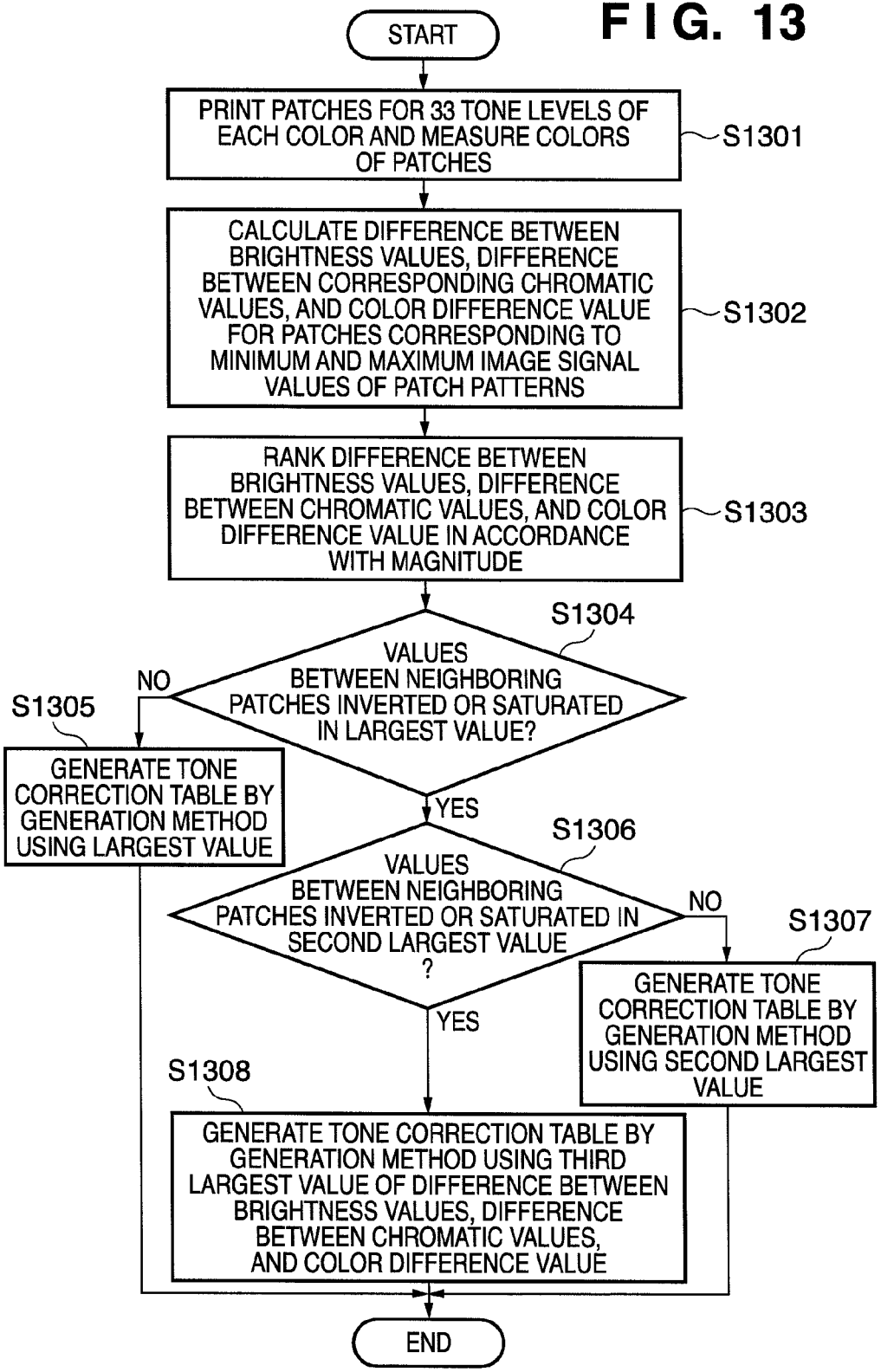
FIG. 13 is a flowchart of the fourth embodiment.

FIG. 13 is a flowchart of the processing for generating a tone correction table or executing calibration by updating the tone correction table.

Referring to FIG. 13, the MPU 1001 acquires the colorimetric values of the patch patterns for tone characteristic control (FIG. 2) formed on the sheet surface; that is, it acquires the brightness values and chromatic values for respective patches (S1301). Based on the colorimetric results of the color patch patterns, the MPU 1001 calculates the differences between the attribute values of patches which respectively correspond to minimum and maximum image signal values; that is, the difference between the corresponding brightness values, that between the corresponding chromatic values, and the color difference value are calculated (S1302). The MPU 1001 determines the largest value among the difference between the brightness values, the difference between the chromatic values, and the color difference (S1303). Regarding the attribute with a largest difference, the MPU 1001 checks if the values between neighboring patches are inverted or saturated (S1304). If the values between neighboring patches are neither inverted nor saturated, the MPU 1001 generates a tone correction table using that attribute with the largest difference (S1305). For example, if the attribute with the largest difference is the brightness, the MPU 1001 generates a tone correction table to attain brightness linearity. If that attribute is the chroma, the MPU generates a tone correction table to attain chroma linearity. If that attribute is the color difference, the MPU generates a tone correction table to attain color difference linearity. Regarding the attribute with the largest difference, if the values between neighboring patches are inverted or saturated, the MPU 1001 checks for the attribute with the second largest difference if values between neighboring patches are inverted or saturated (S1306). Regarding the attribute with the second largest difference, if the values between neighboring patches are neither inverted nor saturated, the MPU 1001 generates a tone correction table using that attribute (S1307). If the values between neighboring patches are inverted or saturated, the MPU 1001 generates a tone correction table using the attribute with the third largest difference (S1308).

When the aforementioned determination method is used, precise tone reproduction can be realized using another value with a largest change amount even in an ink which cannot realize precise tone reproduction due to a small brightness change amount. The ratio of a brightness difference to a brightness expression range (e.g., 0 to MAX in FIG. 7) is calculated, and the same ratios are also calculated for a chroma difference and color difference. Of these calculated ratios, the largest ratio may be determined as an attribute with a largest change amount.

In this embodiment, the difference between the brightness values of patches which respectively correspond to minimum and maximum image signal values, and that between the chromatic values, and the color difference value are calculated, and these three values are ranked in accordance with their magnitudes. Then, it is determined whether the characteristics of each individual attribute suffer any inversion or saturation. However, this order may be reversed. That is, it may be checked first if the characteristics of each attribute suffer any inversion or saturation. After that, the difference between the brightness values of patches which respectively correspond to minimum and maximum image signal values, and that between the chromatic values, and the color difference value may be calculated, and the three values may be ranked in accordance with their magnitudes.

FIG. 13 shows the tone correction table generation method. In the step of generating the tone correction table, calibration may be executed by converting the tone correction table so that the tone characteristic targets of the brightness values, chromatic values, and color difference values of cyan, magenta, yellow, and black have setting values.

In the first to fourth embodiments, the color components or component colors indicate element colors of inks used in a printer.

Other Embodiments

Note that the present invention has exemplified the ink-jet printer. Alternatively, the present invention may be applied to other printing apparatuses such as a laser beam printer, copying machine, facsimile apparatus, and the like.

Each of the above embodiments has exemplified a 4-color machine using C (cyan), M (magenta), Y (yellow), and Bk (black). The first to fourth embodiments can also be applied to a multi-color machine including inks of any of Pc (photo cyan) and Pm (photo magenta) as so-called light inks with low ink densities, and R (red), G (green), and B (blue), in addition to the aforementioned colors.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). The objects of the present invention are also achieved by supplying a storage medium, which records a program code of a software program that can implement the aforementioned functions on the system, and readout and execution of the program code stored in the storage medium by the system. In this case, the program code itself read out from the storage medium implements the functions of the aforementioned embodiments, and the storage medium which stores the program code constitutes the present invention.

Also, the present invention includes a case wherein an operating system (OS) running on a computer executes some or all of actual processing operations based on an instruction of the program code to implement the aforementioned functions. Furthermore, the present invention also applies to a case wherein the program code read out from the storage medium is written to a memory equipped on a function expansion card or function expansion unit which is inserted in or connected to the computer. Then, a CPU or the like equipped on the function expansion card or unit executes some or all of actual processing operations to implement the aforementioned functions.

As described in detail above, according to the present invention, a tone correction table used to correct the tone reproduction of each color in a color image forming apparatus to attain target characteristics can be generated using an appropriate color attribute for each ink. For this reason, a high-quality image can be reproduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-340574 filed on Dec. 18, 2006, which is hereby incorporated by reference herein in its entirety.

What is claimed is:

1. A method of generating a tone correction table used to correct tone characteristics of image data of each component color in a color image forming apparatus, the method comprising:
using a processor to perform:
an output step of outputting color patch images of each component color for respective tone levels corresponding to a plurality of different image data values;
a colorimetry step of acquiring colorimetric values including brightness values, chromatic values, and reflection spectra of respective patches by measuring colors of the output color patch images;
an analysis step of analyzing characteristics of the colorimetric values for respective tone levels based on the colorimetric values of the color patch images;
a selection step of selecting a tone correction table generation method according to the characteristics obtained in the analysis step; and
a generation step of generating a tone correction table to have tone characteristics as target characteristics according to the selected tone correction table generation method,
wherein the selection step calculates the numbers of absorption peaks from the spectral reflection spectra, selects the tone correction table generation method based on the numbers of absorption peaks, and uses, as the tone correction table generation method, at least any of the brightness values, the chromatic values, and color difference values calculated from the brightness values and the chromatic values.

2. The method according to claim 1, wherein the colorimetry step further acquires spectral reflection spectra of the color patches for each component color as the colorimetric values, and the selection step selects a tone correction table generation method based on the spectral reflection spectra acquired in the colorimetry step.

3. The method according to claim 1, wherein the processor further performs a color information acquisition step of acquiring color information indicating a component color of the color patches,
wherein the selection step selects a tone correction table generation method based on the color information of the color patches acquired in the color information acquisition step.

4. The method according to claim 1, wherein when a tone correction table generation method using the brightness values acquired in the colorimetry step or color difference values is selected, the selection step further checks if either the brightness values or the color difference values suffer a saturation or inversion with respect to an increase in image signal, and when either one suffers a saturation or inversion, the selection step selects a tone correction table generation method using the other as a correction target attribute, and
when a tone correction table generation method which uses the chromatic values acquired in the colorimetry step or color difference values is selected, the selection step further checks if either the chromatic values or the color difference values suffer a saturation or inversion with respect to an increase in image signal, and when either one suffers a saturation or inversion, the selection step selects a tone correction table generation method using the other as a correction target attribute.

5. The method according to claim 1, wherein the generation step generates a tone correction table by the tone correction table generation method selected in the selection step so that a relationship between image signal values and a correction target attribute have target characteristics.

6. The method according to claim 5, wherein the selection step checks if characteristics of each attribute are saturated or inverted with respect to an increase in image signal, and if the characteristics are saturated or inverted, the selection step selects, as a correction target attribute, an attribute which has a largest difference between a color patch corresponding to a maximum image signal value and a color patch corresponding to a minimum image signal value.

7. A method of generating a tone correction table used to correct tone characteristics of image data of each component color in a color image forming apparatus, the method comprising:
using a processor to perform:
an output step of outputting color patch images of each component color for respective tone levels corresponding to a plurality of different image data values;
a colorimetry step of acquiring colorimetric values including brightness values, chromatic values, and reflection spectra of respective patches by measuring colors of the output color patch images;
an analysis step of analyzing characteristics of the colorimetric values for respective tone levels based on the colorimetric values of the color patch images;
a selection step of selecting a tone correction table generation method according to the characteristics obtained in the analysis step; and
a generation step of generating a tone correction table to have tone characteristics as target characteristics according to the selected tone correction table generation method,
wherein the component colors include colors C (cyan), M (magenta), Y (yellow), and Bk (black), and the selection step selects a tone correction table generation method which uses the brightness values acquired in the colorimetry step or color difference values as a correction target attribute for C (cyan) and M (magenta) as component colors which have not less than two absorption peaks in the spectral reflection spectra, and for Bk (black) which has no absorption peak, and selects a tone correction table generation method using the chromatic values or color difference values as a correction target attribute for Y (yellow) which has one absorption peak in the spectral reflection spectrum.

8. An apparatus for generating a tone correction table used to correct tone characteristics of image data of each component color in a color image forming apparatus, the apparatus comprising:

an output unit, configured to output color patch images of each component color for respective tone levels corresponding to a plurality of different image data values;

a colorimetry unit, configured to acquire colorimetric values including brightness values, chromatic values, and reflection spectra of respective patches by measuring colors of the output color patch images;

an analyzer, configured to analyze characteristics of the colorimetric values for respective tone levels based on the colorimetric values of the color patch images;

a selector unit, configured to select a tone correction table generation method according to the characteristics obtained by the analyzer; and a generator, configured to generate a tone correction table to have tone characteristics as target characteristics according to the selected tone correction table generation method, wherein the selector unit calculates the numbers of absorption peaks from the spectral reflection spectra, selects the tone correction table generation method based on the numbers of absorption peaks, and uses, as the tone correction table generation method, at least any of the brightness values, the chromatic values, and color difference values calculated from the brightness values and the chromatic values.

9. A non-transitory computer-readable medium recording a program for making a computer execute steps in a method according to claim 1.

10. An apparatus for generating a tone correction table used to correct tone characteristics of image data of each component color in a color image forming apparatus, the apparatus comprising:

an output unit, configured to output color patch images of each component color for respective tone levels corresponding to a plurality of different image data values;

a colorimetry unit, configured to acquire colorimetric values including brightness values, chromatic values, and reflection spectra of respective patches by measuring colors of the output color patch images;

an analyzer, configured to analyze characteristics of the colorimetric values for respective tone levels based on the colorimetric values of the color patch images;

a selector unit, configured to select a tone correction table generation method according to the characteristics obtained by the analyzer; and a generator, configured to generate a tone correction table to have tone characteristics as target characteristics according to the selected tone correction table generation method, wherein the component colors include colors C (cyan), M (magenta), Y (yellow), and Bk (black), and the selector unit selects a tone correction table generation method which uses the brightness values acquired in the colorimetry step or color difference values as a correction target attribute for C (cyan) and M (magenta) as component colors which have not less than two absorption peaks in the spectral reflection spectra, and for Bk (black) which has no absorption peak, and selects a tone correction table generation method using the chromatic values or color difference values as a correction target attribute for Y (yellow) which has one absorption peak in the spectral reflection spectrum.

11. A non-transitory computer-readable medium recording a program for making a computer execute steps in a method according to claim 7.

* * * * *